No. 667,274. Patented Feb. 5, 1901.
C. L. WEIGER.
INDEX.
(Application filed June 27, 1898.)

(No Model.) 3 Sheets—Sheet 1.

Fig. 1.

Witnesses:
J. M. Fowler Jr
Ralph H. Warfield

Inventor
Caroline L. Weiger
By Rhesa G. DuBois &c
Her Attorneys.

No. 667,274. Patented Feb. 5, 1901.
C. L. WEIGER.
INDEX.
(Application filed June 27, 1898.)
(No Model.) 3 Sheets—Sheet 2.

Fig. 2.

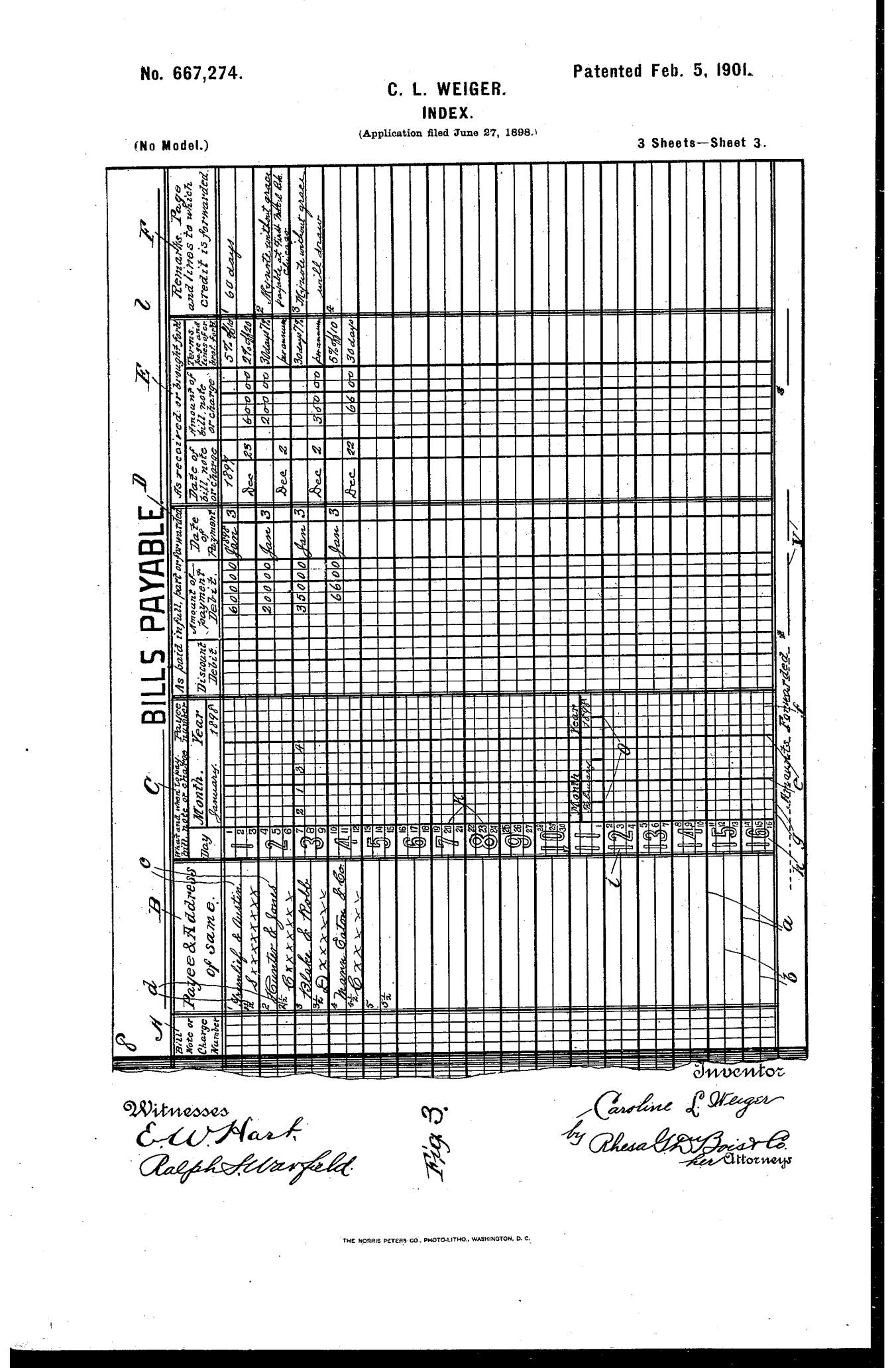

No. 667,274.  
C. L. WEIGER.  
INDEX.  
(Application filed June 27, 1898.)  
Patented Feb. 5, 1901.

(No Model.) 3 Sheets—Sheet 3.

Fig. 3.

Witnesses  
E. W. Hart  
Ralph S. Warfield

Inventor  
Caroline L. Weiger  
by Rhesa G. L. Boist & Co.  
her Attorneys

UNITED STATES PATENT OFFICE.

CAROLINE L. WEIGER, OF JACKSON, MICHIGAN.

INDEX.

SPECIFICATION forming part of Letters Patent No. 667,274, dated February 5, 1901.

Application filed June 27, 1898. Serial No. 684,616. (No model.)

*To all whom it may concern:*

Be it known that I, CAROLINE L. WEIGER, a citizen of the United States, residing at Jackson, in the county of Jackson and State of Michigan, have invented certain new and useful Improvements in Indices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to indices for books, pamphlets, records, &c., and more particularly to such as are used in any connection where the matter originally entered should have consideration at a date subsequent to its entry.

One object is to provide an improved index adapted for use with accounts which will afford means for simplifying and condensing the entries and to so group them that a concise statement of the accounts may be had and their condition made readily observable.

A further object is the provision of an index whereby entries may be made for settlement or consideration at a future date and will be so arranged when entered that they will not be overlooked or forgotten at the time they need attention.

Another object is to provide an improved index adapted for the foregoing uses which may be used independently of other line or column ruling on the same page of surface.

Other objects of the invention, together with its arrangement and novel features, will appear more fully hereinafter.

Figure 2:
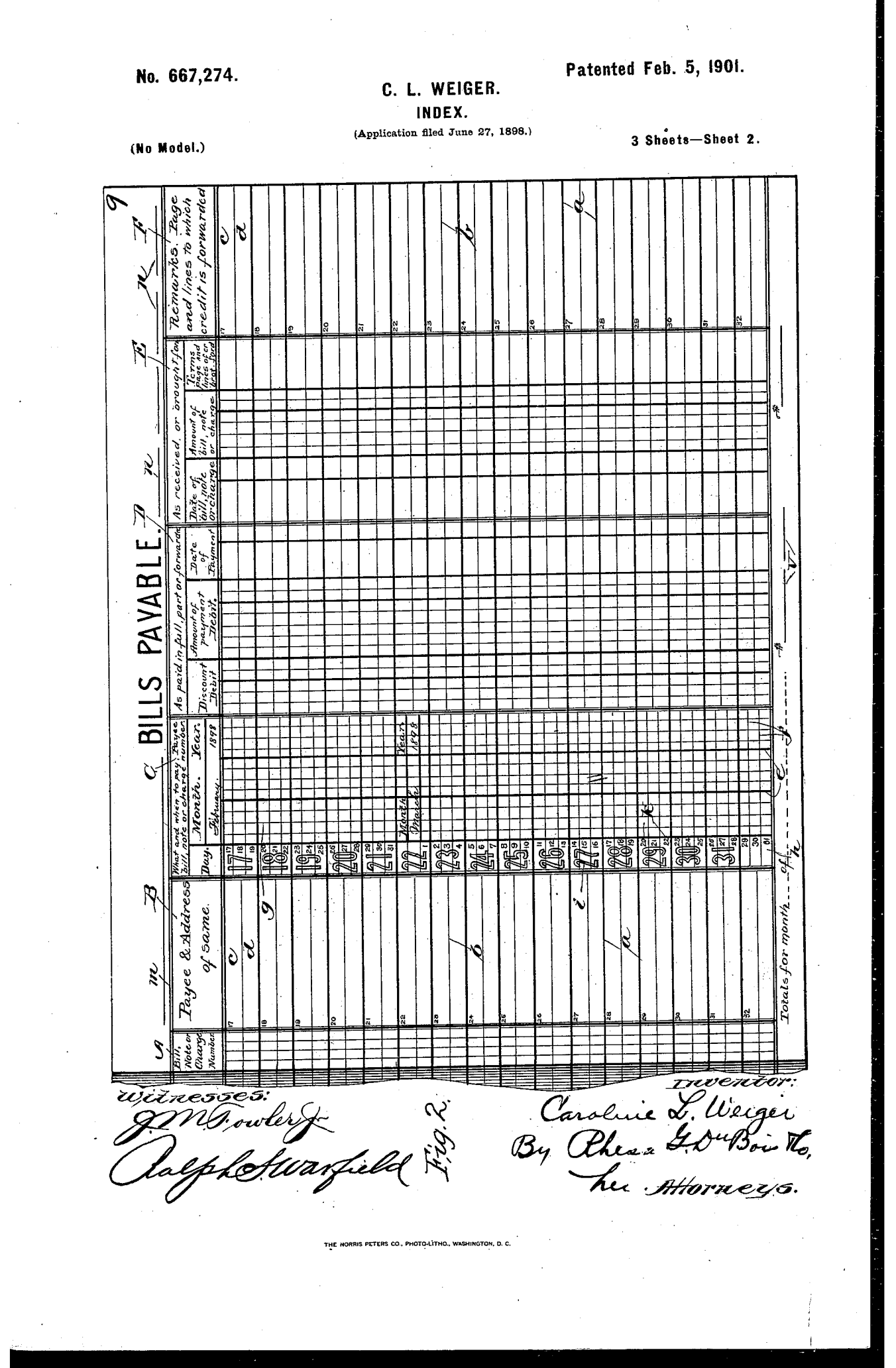

In the accompanying drawings, Figure 1 is a view of the left-hand half of a sheet from an account-book provided with my improved index. Fig. 2 is a view of the right-hand half, and Fig. 3 is a view showing the application of the large numerals.

My improved index being especially adaptable for use with "bills-payable" accounts, I have illustrated it as incorporated with a sheet from a book of such an account and will describe it in this connection. For the sake of explanation the several columns of the index and account are respectively lettered "A," "B," "C," "D," "E," and "F." The columns A, B, and C constitute the index, columns D, E, and F being used to contain the data of the various accounts. However, if desirable, either column A or column B may be dispensed with, according to the manner in which the index is to be employed. Regularly-disposed horizontal lines $a$, which are continued through all the columns, divide the column A into blocks, which are subdivided horizontally by lines $b$, which also divide the blocks formed in column B by lines $a$ and are spaced off by vertical lines. Column A is used when a separate invoice-book is employed in keeping the various accounts, the bills being pasted in the said book and numbered, as "1," "2," "3," &c. The accounts, of which the data is contained in the remaining columns, (except column B,) are identified with these bills by entering the numbers of the respective bills in the spaces of the subdivisions of the blocks of column A. When, however, the generally more desirable system of identifying the accounts directly on the account-book is employed, the blocks in column B are used and column A remains blank or may be put to any suitable use in connection with the matter in column B. The upper spaces $c$ of column B are numbered consecutively from top to bottom of said column, said upper spaces being used to receive the name of the payee, while the lower spaces $d$ of the blocks are for accommodating the addresses of the latter. If, however, owing to the great number of accounts to be accommodated, it is desirable to economize space, the lower spaces $d$ can be numbered "$1\frac{1}{2}$," "$2\frac{1}{2}$," "$3\frac{1}{2}$," &c., and separate accounts entered therein, the address of the payee either being omitted or placed on the same line with his name. These numbers "$1\frac{1}{2}$," "2," "$2\frac{1}{2}$," &c., are for the purposes of identification of the different accounts, as will appear more clearly hereinafter. Column C constitutes the key of the index and the whole system of accounts, and hence I shall call the same the "key-column." The blocks of this column are divided into subblocks by regularly-spaced vertical lines $e$, and these subblocks are divided into horizontal spaces by horizontal lines $f$, which are in turn subdivided four times by vertical lines $g$. It will be observed that the four subdivisions thus provided in the spaces correspond in number with the subdivisions in the spaces of the blocks of column A, so as to be capable of receiving bill-designating numbers similar to those entered in said column, as well as to receive the space designations "1," "1½," "2," "2½," &c., of column B. The key of the key-column is embraced in the narrow column $h$, which is located in the left-hand side of said column. This column $h$ contains two sets of numerals—the large open-faced ones, $i$, designating separately in consecutive arrangement the complete horizontal blocks at their right in column C and extending the entire length of the latter and the small ones, $k$, being arranged in consecutive order in sets of three in the blocks of column C and opposite the respective horizontal spaces thereof. Both sets of numerals run from "1" to "31," inclusive, and while there is but one set of the numerals $i$ there are three sets of the numerals $k$. In this connection it will be observed that the column C is divided into three sections, each having its appropriate heading of month and year, which are preferably printed in the book and embracing one-third of the numerals $i$ and an entire set of the numerals $k$. With such an arrangement of numerals and division of the key-column the index is adapted either to an account where there are several items to be entered daily or only one every two or three days, the numerals $i$ being used with the greatest economy of book-space where the daily entries are numerous and the numerals $k$ where an entry is made every two or three days only, and consequently a single sheet can be used either for a single month's entries or for the entries of three months, according to the condition of the account. The numerals in the two sets, as will be observed, represent the days of the month.

The arrangement and uses of columns D and E will be apparent from the drawings and description to be given hereinafter. Column F is blocked off, spaced, and numbered in the same manner as column B, its numbers corresponding in line identification to those in this column. Column F is used for recording explanatory matter relating to the different items or accounts, as well as showing where they are continued if not completed, &c., as will more clearly appear presently. It is not essential that the blocks and lines of column C be alined with those of the other columns, although for convenience they are generally so located, as its proper use is in no manner dependent upon its position.

As it is sometimes desirable to use the pages containing the index for ledger purposes, they are provided with lines $l$, $m$, and $n$ at their tops for the accommodation of the necessary data.

The examples shown in the drawings, together with the following description, will render the manner of using the index clear. In the first four examples (blocks 1, 2, 3, and 4, Fig. 3) the accounts occupy the entire blocks, and in these instances the large open-faced numerals $i$ are used, the other numerals $k$ being entirely disregarded. Referring to column E, the data of the block which is numbered "1" (see numeral in upper left-hand corner of block containing name and address of payee) is here found, the date of the bill being "December 23, 1897," the amount "$600," and the terms being five per cent. discount if paid within ten days or two per cent. off if paid within twenty days. The entire length of credit (sixty days) is entered in column F in the space "1" to identify the entry with the account. It being decided to pay the bill within ten days, and thus take advantage of the discount, the identifying account-number ("1") is entered in key-column C in the block at the right of the open-faced numeral "3" and under the month of "January, 1898," this being the date of maturity on which payment should be made, owing to the fact that the second day of January, upon which the bill falls due, in reality is Sunday, and therefore payment is deferred until the following day, Monday, January 3. Consequently when the day of January 3, 1898, arrives it will be apparent that account "1" is to be paid at that time. At the time of actual payment the date of payment, the discount, if any, and the amount paid are entered up in the column D and the account is closed. When a large number of accounts are to be entered, it is better to use one space only of the block of column B instead of an entire block for the entry of the account, and when this is done the lower spaces of the block are numbered "1½," "2½," &c., Fig. 1. When this is done, the small numerals $k$ are used for the dates of payment, and no attention whatever is paid to the large numerals $i$, and in entering up the accounts by their identification-numbers in the key-column they must be placed in the spaces formed by the lines $f$ in alinement with the date on which they are to be settled. For example, in account "9½" the bill is dated "January 21, 1898," is for "$100," and is due in thirty days, or if paid within ten days will be entitled to a discount of two per cent. It having been decided to pay the bill at the expiration of ten days, which would make it fall due on January 31, 1898, the number "9½" is entered in the key-column in line with the numeral "31" in the series of numerals $k$, indicating that it is to be paid on that date. The time of payment, amount paid, and discount are at the time of payment entered in column D. In this connection it will be observed that a number of accounts fall due on January 31, 1898. So to prevent confusion in the account-identifying numbers the lower space of this block of the key-column, which is the one employed to receive entries of all accounts falling due on January 31, 1898, when the blocks of column B are each used to receive two independent accounts is subdivided, as shown at $o$, to keep the numbers separated. If the accounts falling due on this date are so numerous that there is not sufficient space for the entry of some of them, then the column F is employed to accommodate the additional identifying number or numbers. For example, account "10" falls due on January 31, 1898; but there might not be sufficient space to enter it. Now account "9½" also falls due on that date and might be the last account which could conveniently be entered in the key-column C. Consequently when account "9½" is reached the words "Pay account № 10 also" are entered in space "9½" in column F, and hence when account "9½" is paid it will be obvious that account "10" should be paid also.

It sometimes happens that an item is not paid in full on the date set for payment. For example, in account "5," which is for fifteen hundred dollars, a payment of five hundred dollars only is due on February 1, 1898. As the account is not completely settled, the amount actually paid is entered in column D on the line of identification, and the balance "$1,000" is entered immediately above, as shown at $p$. The amount to be forwarded and the details of the account are then entered on an advance page in the book, and their new position is indicated by the memorandum $q$, as "Ford. 10-5," meaning that the account is continued on page 10, as item 5. Memorandum as to interest paid is entered, as at $r$, in column F. If, however, the future day set for payment would fall in one of the months indicated on the same page where the account was originally entered, then the account-identification number can be entered as of the new date of payment and the other entry checked off, if desired. Another example of the system of carrying forward unpaid items is shown at $s$ in column C under date of "January 7, 1898." Here the designation "6-3" indicates that a matter of original entry found on page 6, line 3, has been set for treatment or payment on the latter date of January 7, 1898, which dispenses with the necessity of again entering the data of the original entry, and entries can be thus carried forward from time to time as desirable.

When the bills themselves are pasted in an invoice-book or otherwise kept together in proper order, it is of course unnecesary to use column B to enter up the payee and his address, and column A is then used to receive the numbers which identify the different bills and with which they have been designated. Consequently in the reading of the entries in the various columns it is only necessary to turn to the bill bearing the corresponding number, and the party to be paid is at once identified. The manner of using the index and the different columns is the same as previously set forth. For example, account "2,000" runs from December 23, 1897, and being decided to be paid in ten days, therefore, falls due on January 3, 1898, and hence is entered for payment in one of the spaces opposite "3" in the series of numerals $i$ or $k$.

The blank blocks in column B can be used to receive any matter explanatory of the bills bearing the numbers entered in column A, an example of which numbers is shown at $t$.

At the foot of the sheet is a suitable matter $v$ to permit of properly balancing the "debit" and "credit" columns in the well-known manner.

Having thus described my invention, what I claim as new, and desire to secure by Letters Patent, is—

1. An index comprising an item-column having spaces provided with indicia, and a key-column embodying subdivided blocks for the reception of entries and a key consisting of two series of indicia representing days of the month, the members of one series each designating an entire block and the members of the other series being arranged in sets, the component integers of which represent the subdivisions of the respective blocks, whereby entries in said blocks or subdivisions thereof, corresponding to the indicia of the spaces of the item-column, identify the entries in said spaces with the days of the month.

2. An index comprising an item-column having subdivided blocks and indicia for the respective subdivisions, and a key-column having subdivided blocks for the reception of entries and a key consisting of two series of numerals representing days of the month, the integers of both series being arranged consecutively and those of one series each designating an entire block and those of the other series being arranged in sets for the blocks and representing individually the respective subdivisions, whereby entries in said blocks or subdivisions thereof, corresponding to the indicia of the spaces of the item-column, identify the entries in said spaces with the days of the month.

3. An index comprising an item-column having subdivided blocks and indicia for the respective subdivisions, and a key-column divided into a plurality of sections each having subdivided blocks for the reception of entries and representing an entire month and a key consisting of a series of numerals representing consecutive days of the month, the integers of which each represent an entire block, said series extending the length of the column, and an independent complete series of numerals for each section of the key-column, said numerals also representing consecutively, the days of the month and being arranged in sets the integers of which each designate a separate subdivision of a block, whereby entries in said blocks or subdivisions thereof, corresponding to the indicia of the spaces of the item-column, identify the entries in said spaces with the days of the month.

In witness whereof I affix my signature in presence of two witnesses.

CAROLINE L. WEIGER.

Witnesses:
A. L. WEIGER,
FRANK CUMMINGS.